United States Patent
Ridgeway et al.

(10) Patent No.: US 7,278,660 B2
(45) Date of Patent: Oct. 9, 2007

(54) RAKE AND TELESCOPE COLUMN LOCK SAFETY FUNCTION

(75) Inventors: Jason R. Ridgeway, Bay City, MI (US); Damir Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 389 days.

(21) Appl. No.: 10/960,824

(22) Filed: Oct. 7, 2004

(65) Prior Publication Data

US 2006/0076763 A1   Apr. 13, 2006

(51) Int. Cl.
B62D 1/18   (2006.01)

(52) U.S. Cl. .................. 280/775; 180/271; 74/493

(58) Field of Classification Search ............. 280/775, 280/779, 780; 74/492, 493; 180/271, 280
See application file for complete search history.

(56) References Cited

U.S. PATENT DOCUMENTS

| | | | |
|---|---|---|---|
| 4,029,168 A | 6/1977 | Kramer | |
| 4,046,024 A | 9/1977 | Broucksou | |
| 4,475,744 A | 10/1984 | Leutz | |
| 4,584,857 A | 4/1986 | Weber | |
| 4,656,888 A | 4/1987 | Schmitz | |
| 4,753,121 A | 6/1988 | Venable et al. | |
| 4,793,204 A | 12/1988 | Kubasiak | |
| 4,798,067 A | 1/1989 | Peitsmeier et al. | |
| 4,972,732 A | 11/1990 | Venable et al. | |
| 4,976,167 A | 12/1990 | Venable et al. | |
| 4,989,312 A | 2/1991 | Maddalena | |
| 5,088,766 A | 2/1992 | Nakatsuka et al. | |
| 5,148,717 A | 9/1992 | Yamaguchi | |
| 5,207,451 A * | 5/1993 | Furuse et al. | 280/775 |
| 5,270,932 A * | 12/1993 | Yoshizawa et al. | 701/41 |
| 5,570,610 A | 11/1996 | Cymbal | |
| 6,035,739 A | 3/2000 | Milton | |
| 6,036,228 A | 3/2000 | Olgren et al. | |
| 6,467,787 B1 | 10/2002 | Marsh | |

(Continued)

FOREIGN PATENT DOCUMENTS

DE   4118195   12/1991

(Continued)

Primary Examiner—Paul N. Dickson
Assistant Examiner—Drew J. Brown
(74) Attorney, Agent, or Firm—Michael D. Smith

(57) ABSTRACT

An apparatus has an adjustable steering column that moves between first and second positions along a path. The path defines tilting movement of at least a portion of the steering column, telescoping movement of at least a portion of the steering column, or both tilting and telescoping movement. The apparatus also includes a lock moveable between locked and unlocked positions. When the lock is in the locked position, the steering column can not move adjustably along the path. When the lock is in the unlocked position, the steering column can be adjusted along the path. The apparatus also includes a switch operable to emit an unlock signal, and a controller communicating with the switch to receive the unlock signal. The controller controls the lock to move to the unlocked position in response to the unlock signal. The apparatus also includes a signal generator operable to emit a second signal to the controller. The controller overrides the unlock signal and controls the lock to move to the locked position in response to the second signal.

22 Claims, 2 Drawing Sheets

U.S. PATENT DOCUMENTS

| | | |
|---|---|---|
| 6,604,439 B2 | 8/2003 | Gaukel |
| 6,623,036 B2 | 9/2003 | Yamamura et al. |
| 6,725,960 B1* | 4/2004 | Schonlau .................... 180/271 |
| 2002/0033297 A1 | 3/2002 | Ohki et al. |
| 2004/0150207 A1* | 8/2004 | Satou ......................... 280/777 |
| 2006/0131863 A1* | 6/2006 | Riefe et al. ................. 280/775 |

FOREIGN PATENT DOCUMENTS

| | | |
|---|---|---|
| DE | 19829239 | 1/1999 |
| EP | 0442627 | 8/1991 |
| EP | 1008506 | 6/2000 |
| JP | 03-128763 | 8/1991 |

* cited by examiner

RAKE AND TELESCOPE COLUMN LOCK SAFETY FUNCTION

FIELD OF THE INVENTION

The invention relates to a steering column of a vehicle and more particularly to a lock for a steering column that is moveable between first and second positions along a path of adjusting movement.

BACKGROUND OF THE INVENTION

Vehicles are often equipped with steering columns that adjust the position of the steering wheel to enhance the comfort and safety of the driver. For example, the steering column may telescope to move closer to and away from the driver. Also, the position of the steering wheel may be tilted or raked relative to other components of the column. These features cooperate to allow the driver to adjust the steering wheel to a desired, convenient position for operating the vehicle, and for enabling the wheel to be moved out of the way to provide greater access to getting into and out of the driver's seat of the vehicle. Adjustable steering columns also include locks for maintaining the steering column in the desired position. Steering column locks can be mechanical or electromechanical. It is important to lock the steering column between adjustments and while the vehicle is moving to enhance the safe operation of the vehicle.

SUMMARY OF THE INVENTION AND ADVANTAGES

The present invention provides an apparatus including a steering column movable between first and second positions along a path. The path defines tilting movement of at least a portion of the steering column, telescoping movement of at least a portion of the steering column, or both tilting and telescoping movement. The apparatus also includes a lock moveable between locked and unlocked positions. When the lock is in the locked position, the steering column is locked along the path. When the lock is in the unlocked position, the steering column is moveable along the path. The apparatus also includes a switch operable to emit an second signal. The apparatus also includes a controller communicating with the switch to receive the unlock signal. The controller controls the lock to move to the unlocked position in response to the unlock signal. The apparatus also includes a signal generator operable to emit a second signal to the controller. The controller overrides the unlock signal and controls the lock to move to the locked position in response to the second signal.

In the exemplary embodiment of the invention, the signal generator can be associated with a timer, a sensor of the vehicle, a supplemental inflatable restraint sensor, or any combination of a timer, a sensor of the vehicle, a supplemental inflatable restraint sensor. It is desirable to override the unlock signal to reduce the likelihood that the steering column could move in predetermined conditions such as during vehicle travel or during an impact.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
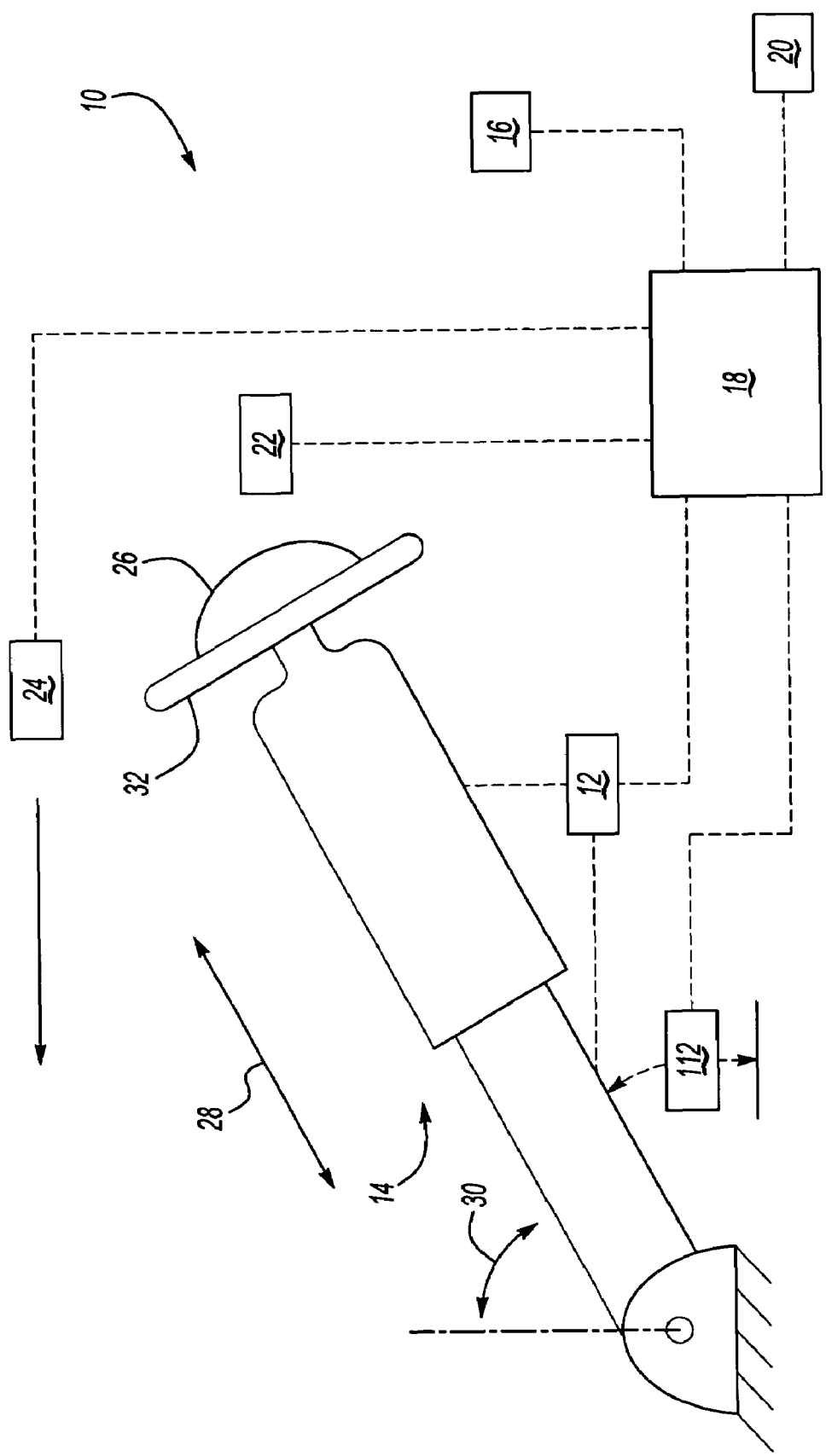
FIG. 1 is a schematic view of an exemplary embodiment of the invention.

Referring now to FIG. 1, the inventive apparatus 10 includes a steering column 14. The steering column 14 is adjustable, movable between first and second positions along a path. The path can be a telescoping path 28 and/or a tilting/raking path 30. The steering column 14 is positionable in a vehicle for supporting a steering wheel 32.

The apparatus 10 also includes a lock, such as lock 12 and/or lock 112, that is moveable between locked and unlocked positions to selectively lock the steering column 14 along the path. In the exemplary embodiment of the invention, the lock 12 is moveable between locked and unlocked positions to selectively prevent the steering column 14 from moving along the telescoping path 28. The lock 112 is moveable between locked and unlocked positions to selectively prevent the steering column 14 from moving along the tilting/raking path 30. In alternative embodiments of the invention, a single lock could selectively prevent the steering column 14 from moving along the telescoping path 28, or along the tilting/raking path 30, or both paths 28, 30.

The apparatus 10 also includes a switch 16 operable to emit an unlock signal. The switch 16 can be disposed on an instrument panel of the vehicle, or on the steering column, or anywhere else on the vehicle. The driver of the vehicle engages the switch 16 to move at least one of the locks 12, 112 to the unlocked position and adjust the position of the steering wheel 32 by moving the steering column 14 along one of the paths 28, 30.

The apparatus 10 also includes a controller 18 communicating with the switch 16. The controller 18 receives the unlock signal from the switch 16 and moves at least one of the locks 12, 112 to the unlocked position in response to said unlock signal. The switch 16 and the controller 18 could cooperate in different ways. For example, the controller 18 could maintain the at least one lock 12, 112 in the unlocked position only while the unlock signal is being emitted by the switch 16. In other words, the driver would be required to keep the switch 16 pressed to maintain the at least one lock 12, 112 in the unlocked position. The controller 18 would move the at least one lock 12, 112 to the locked position as soon as the unlock signal terminates. Alternatively, the controller 18 could move the at least one lock 12, 112 to the unlocked position and maintain the at least one lock 12, 112 in the unlocked position until a second signal, different from the unlock signal is received. For example, a second, "lock" switch could be disposed on the instrument panel of the vehicle. The second switch would generate a "lock signal" and the controller 18 could move the at least one lock 12, 112 to the locked position in response to the lock signal.

The apparatus 10 also includes a signal generator, such as signal generators 20, 22, 24, operable to emit a second signal to the controller 18. The controller 18 overrides the unlock signal and moves the at least one lock 12, 112 to the locked position in response to the second signal. The signal generators 20, 22, 24 are operably separate from the second, "lock" switch discussed immediately above. For example, the signal generators 20, 22, 24 generate the second signal outside of the immediate control of the driver and are substantially independent of the function of the switch 16. The controller 18 of the exemplary embodiment of the invention is operable to concurrently receive the unlock signal from the switch 16 and the second signal from the signal generator 20, 22, 24.

Figure 2:
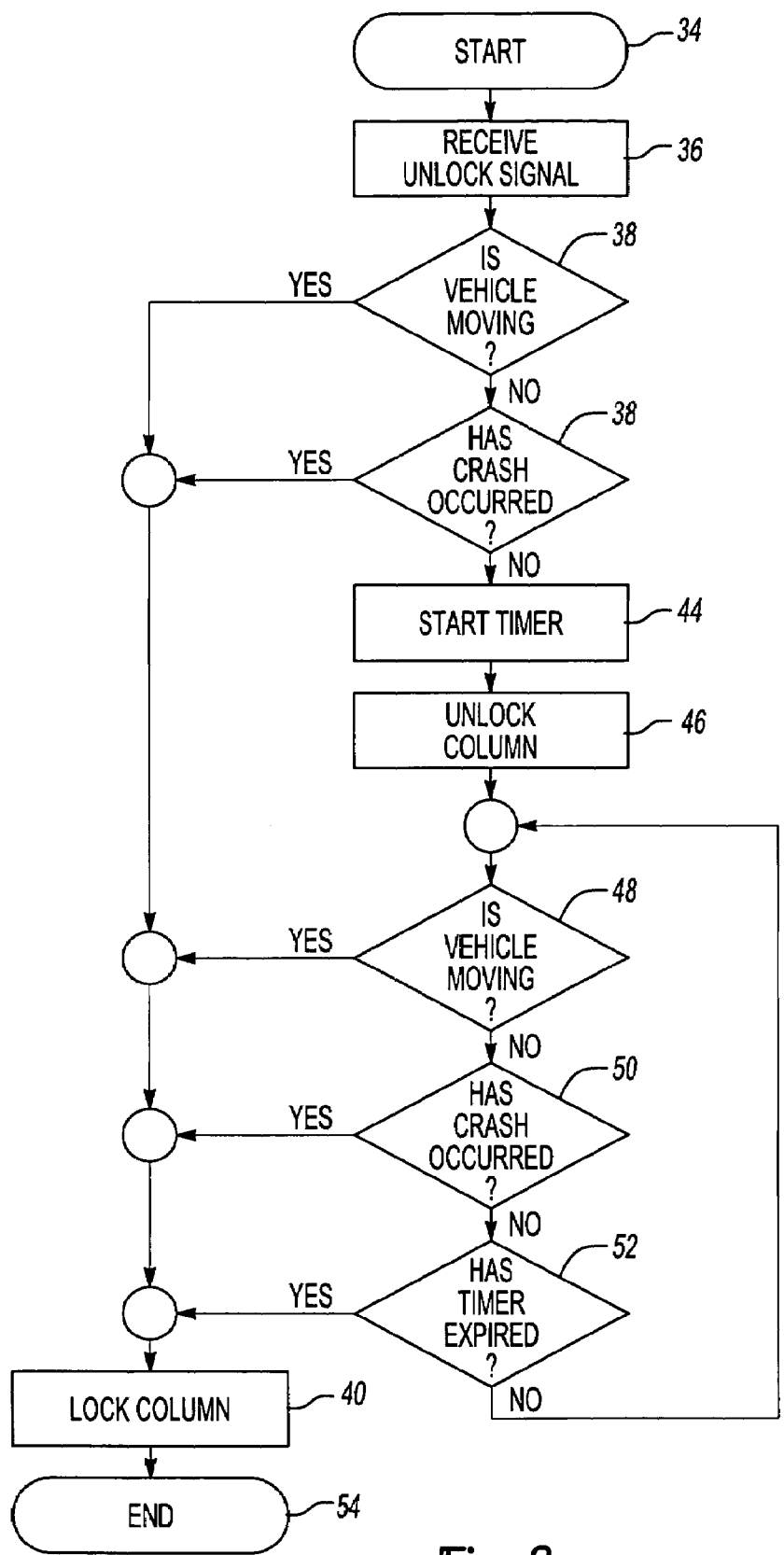
FIG. 2 is a simplified flow diagram of a process according to the exemplary embodiment of the invention.

An exemplary process according to the invention is illustrated in FIG. 2. The process starts at step 34. At step 36, the controller 18 receives the unlock signal from the switch 16. The controller 18 determines whether the vehicle is moving at step 38. The controller 18 communicates with a signal generator 24 to address query step 38. The signal generator 24 includes a vehicle movement sensor. The movement sensor can sense be operable to sense any form of vehicle movement: velocity, acceleration, or lateral movement. The signal generator 24 emits the second signal when movement is sensed. The second signal generated by the signal generator 24 corresponds to vehicle movement. It is desirable to maintain the steering column 14 in a locked configuration during vehicle movement.

If the vehicle is moving at step 38, the process moves to step 40 and the controller 18 confirms that the steering column 14 is locked. If the vehicle is not moving at step 38, the controller 18 determines whether a crash has occurred at step 42. The controller 18 communicates with a signal generator 22 to address query step 42. The signal generator 22 includes a distress or supplemental inflatable restraint sensor. If a supplemental inflatable restraint associated with the vehicle has been deployed, the signal generator 22 emits the second signal. The second signal generated by the signal generator 22 corresponds to a vehicle crash. It is desirable to maintain the steering column 14 in a locked configuration during or after a vehicle crash.

If a crash has occurred at step 42, the process moves to step 40 and the controller 18 confirms that the steering column 14 is locked. If a crash has not occurred at step 42, the controller 18 starts a timer at step 44. The controller 18 communicates with a signal generator 20 to address step 44. The signal generator 20 includes a timer that is started at step 44. At step 46, the controller 18 unlocks the steering column 14.

After the steering column 14 is unlocked at step 46, the controller 18 determines whether the vehicle is moving at step 48 and if a crash has occurred at step 50. The controller 18 can monitor vehicle conditions while the steering column 14 is unlocked and locked the steering column 14 if conditions change. If the vehicle starts to move or is involved in a crash, the process continues to step 40 and the steering column is locked. If the vehicle is not moving and is not involved in a crash, the process continues to step 52 and the controller 18 determines if the timer of the signal generator 20 has expired. The timer of the signal generator 20 can be set for any period of time. In one embodiment of the invention, the timer of the signal generator 20 may time a period of twenty seconds. In another embodiment of the invention, the timer of the signal generator 20 may time a period of forty seconds. It is desirable to lock the steering column 14 after a predetermined period of time; the driver may inadvertently forget to lock the steering column 14 after unlocking the steering column 14. If the timer of the signal generator 20 has not expired at step 52, the process returns to step 48. If the timer of the signal generator 20 has expired at step 52, the signal generator 20 emits the second signal to the controller 18. The second signal generated by the signal generator 20 corresponds to expiration of the timer of the signal generator 20. The process continues to step 40 and the steering column 14 is locked. The process ends at step 54.

In alternative embodiments of the invention, a switch such as switch 16 could be disabled under certain circumstances. In other words, the switch would be prevented from emitting the unlock signal. For example, if the transmission is shift out of the drive position or if the velocity of the vehicle exceeds a certain value, or any combination of transmission shift and vehicle velocity value. In the exemplary embodiment of the invention, the switch 16 can emit the unlock signal when engaged by the driver, but the controller 18 will disregard or override the unlock signal.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
    a steering column movable between first and second positions along a path defining at least one of tilting movement and telescoping movement;
    a lock moveable between locked and unlocked positions to selectively lock said steering column along said path;
    a switch operable to emit an unlock signal;
    a controller communicating with said switch to receive said unlock signal and move said lock to said unlocked position in response to said unlock signal; and
    a signal generator operable to emit a second signal to said controller, wherein said controller overrides said unlock signal and moves said lock to said locked position in response to said second signal.

2. The apparatus of claim 1 wherein said controller is operable to concurrently receive said unlock signal from said switch and said second signal from said signal generator.

3. The apparatus of claim 1 wherein said signal generator further comprises:
    a timer operable to time a period starting when said switch emits said unlock signal.

4. The apparatus of claim 3 wherein the controller is operable to control movement of said lock in response to said timer.

5. The apparatus of claim 4 wherein said second signal corresponds expiration of said period.

6. The apparatus of claim 1 wherein said signal generator further comprises:
    a distress sensor operable to emit said second signal in response to a sensed distress condition.

7. The apparatus of claim 6 wherein said distress sensor is operable to sense deployment of a self-inflating restraint.

8. The apparatus of claim 1 wherein said signal generator further comprises:
    a movement sensor operable to emit said second signal in response to sensed movement.

9. The apparatus of claim 8 wherein said movement sensor is operable to sense lateral movement of a vehicle.

10. The apparatus of claim 8 wherein said movement sensor is operable to sense rapid deceleration of a vehicle.

11. The apparatus of claim 8 wherein said movement sensor is operable to sense a velocity of a vehicle.

12. The apparatus of claim 1 wherein said lock is an electro-mechanical lock.

13. A method comprising the steps of:
moving a steering column between first and second positions along a path defining at least one of tilting movement and telescoping movement;
locking the steering column with respect to said path with a lock moveable between locked and unlocked positions;
emitting an unlock signal with a switch;
communicating said unlock signal from said switch to a controller operable to control movement of said lock in response to said unlock signal;
emitting a second signal to the controller with a signal generator operably separate from the switch, wherein said controller overrides said unlock signal and moves said lock to said locked position in response to said second signal.

14. The method of claim 13 including the step of:
concurrently receiving the unlock signal from the switch and the second signal from the signal generator with the controller.

15. The method of claim 14 including the step of:
moving the lock to the locked position while receiving the unlock signal from the switch.

16. The method of claim 13 wherein said emitting step includes the step:
timing a period beginning when the switch emits the unlock signal with a timer.

17. The method of claim 16 including the step of:
moving the lock to the locked position in response to the end of the period.

18. The method of claim 13 wherein said emitting step includes the step:
sensing an operating condition of a vehicle; and
emitting the second signal in response to said sensing step.

19. The method of claim 18 wherein said sensing step includes the step of:
sensing an axial velocity of the vehicle.

20. The method of claim 18 wherein said sensing step includes the step of:
sensing a transverse velocity of the vehicle.

21. The method of claim 13 wherein said emitting step includes the step:
sensing deployment of a self-inflating restraint associated with a vehicle.

22. An apparatus comprising:
an adjustable steering column movable between first and second positions along a path defining at least one of tilting movement and telescoping movement;
an electric lock moveable between locked and unlocked positions to selectively lock and unlock said steering column along said path;
a manual switch operable to emit an unlock signal;
a controller communicating with said switch to receive said unlock signal and move said lock to said unlocked position in response to said unlock signal; and
a signal generator including an electric override operable to emit a second signal to said controller, wherein said controller overrides said unlock signal and move said lock to said locked position in response to said second signal.

* * * * *